Dec. 3, 1940.    W. L. MARTIN    2,223,768
METHOD OF MAKING RAZOR HEADS
Original Filed Jan. 11, 1938    3 Sheets-Sheet 1
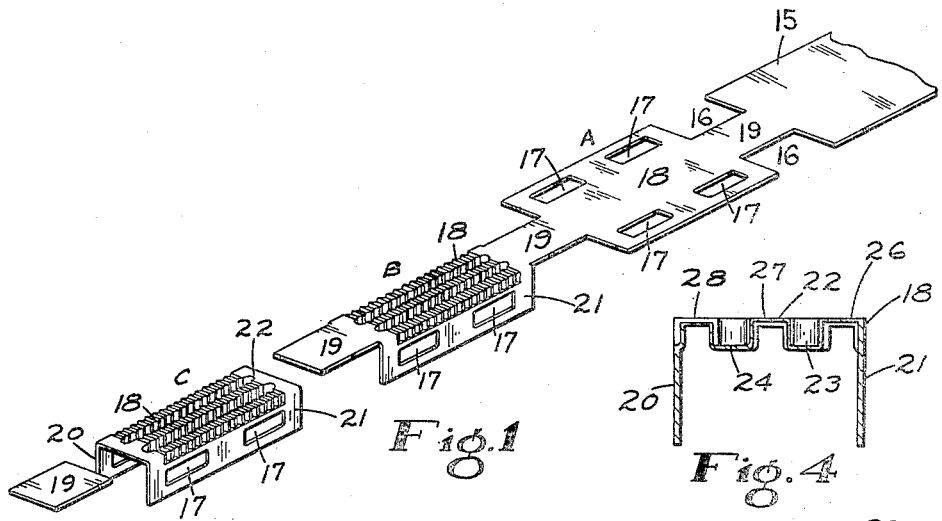
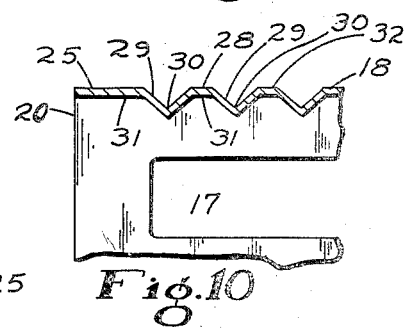
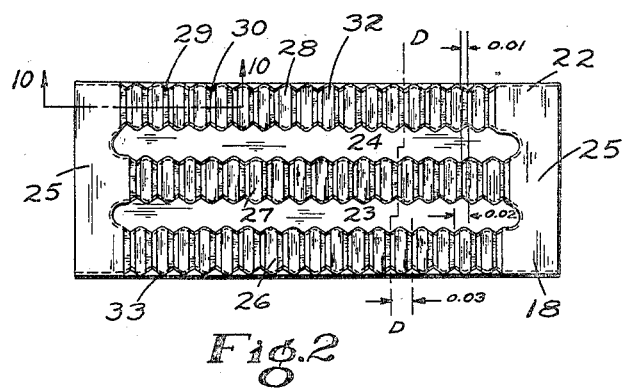
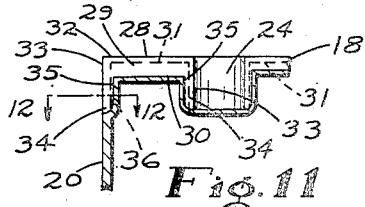
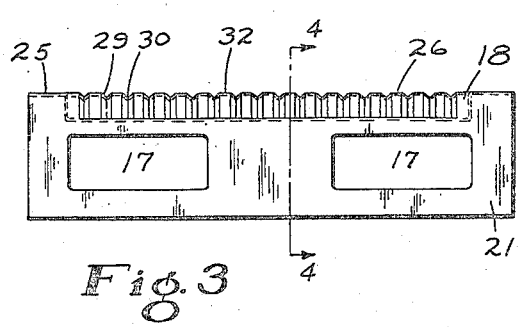
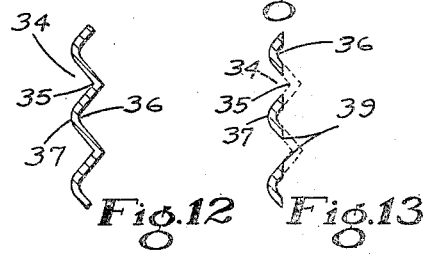
WENDELL L. MARTIN
INVENTOR
BY
ATTORNEY Dec. 3, 1940.    W. L. MARTIN    2,223,768
METHOD OF MAKING RAZOR HEADS
Original Filed Jan. 11, 1938    3 Sheets-Sheet 2
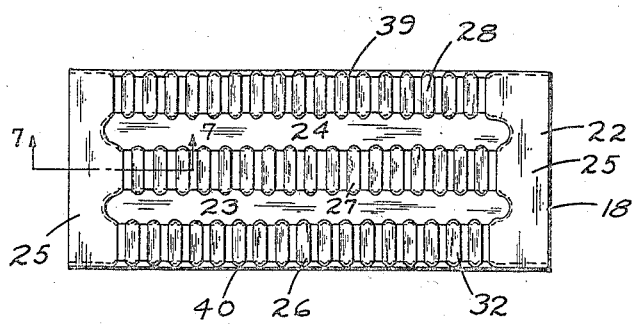
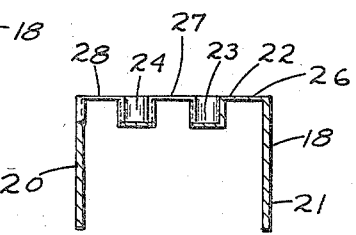
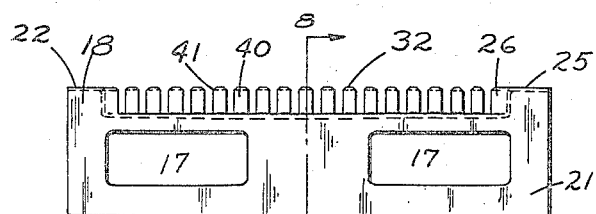
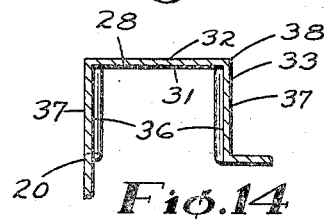
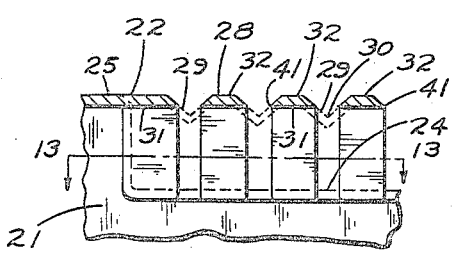
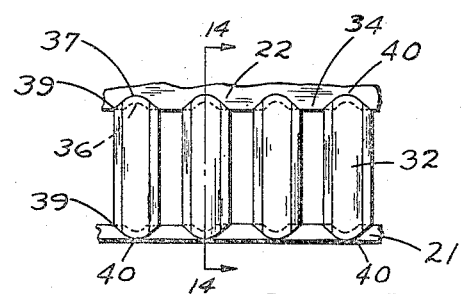
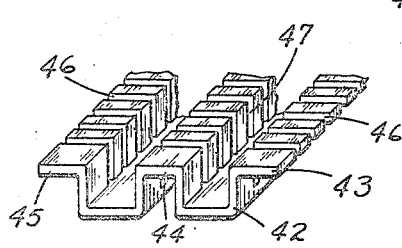
WENDELL L. MARTIN
INVENTOR
BY
ATTORNEY

WENDELL L. MARTIN
INVENTOR

BY
ATTORNEY

Patented Dec. 3, 1940

2,223,768

UNITED STATES PATENT OFFICE 2,223,768

METHOD OF MAKING RAZOR HEADS

Wendell L. Martin, Shaker Heights, Ohio, assignor to The Martin Brothers Electric Company, Cleveland, Ohio, a corporation of Ohio Original application January 11, 1938, Serial No. 184,464. Divided and this application July 30, 1938, Serial No. 222,531

7 Claims. (Cl. 76—104)

This invention relates to methods of manufacturing heads or shear plates for razors of the dry shave type such as electric razors and the like.

This application is a division of application Ser. No. 184,464 filed Jan. 11, 1938.

Razor heads, also referred to as shear plates, stationary blades, exterior blades or guards, are usually made of relatively thin metal plate bent to any desired shape and provided with a plurality of minute slots having lands or teeth therebetween, each tooth being generally formed with one or two cutting edges cooperating with similar teeth and cutting edges of the movable blade or cutter which is reciprocable within the razor head for effecting a shearing or cutting action.

Heretofore, the minute slots formed within the shear plate extended laterally across the plate with a land or tooth between each slot of a width substantially equal to that of the slots. The width of the slots being generally less than ten thousandths of an inch, it was difficult and expensive, due to the delicate nature of the tools used for that purpose, to either mill, grind or otherwise machine these slots, with the result that the cutting edges of the teeth formed thereby was not perfectly sharp to afford a clean, rapid and efficient shave.

The slots being generally straight parallel slots extending laterally from one side of the plate to the other, necessarily had lands or teeth therebetween which would prevent airs to be admitted into the slots and be sheared by the cutter during one stroke of the razor. In other words, with this type of shear plate the razor was only capable of cutting a plurality of parallel furrows, leaving uncut hairs between each furrow, and consequently necessitating the user to go over the skin many times before a substantially clean shave could be obtained.

The slots heretofore provided within shear plates of this type were generally of the same width throughout, and since this width was generally limited to ten thousandths of an inch or less, it was often difficult to have the hairs admitted into the slots for shearing operation by the cutter.

It is therefore one object of this invention to provide an improved method of manufacturing shear plates of the type above mentioned, the method being characterized by the fact that it eliminates the use of delicate cutting tools for forming the slots within the plate, and produces lands or teeth between each slot having a sharp cutting edge of an angle materially less than 90°.

Another object of this invention is to produce an improved shear plate for a cutting device of the type above mentioned having a plurality of cutting edges or teeth extending along the plate and formed by minute slots transversely of the plate, the slots being all parallel to each other but off set laterally in a manner causing any straight line extending across the plate to be intersected by at least one slot, thereby allowing a surface equal in width to the length of the plate to be shaved during each stroke of the razor.

A further object of this invention is to produce a shear plate with a plurality of longitudinally and laterally spaced teeth each terminated by a tapered or substantially pointed end acting as a comb for directing the hairs into the slots between the teeth preparatory to the shearing thereof by the cutter.

A still further object of this invention is to provide a shear plate with teeth having, in addition to the usual horizontal cutting edges, vertical cutting edges located within and on the marginal line of the shearing area of the plate.

In the accompanying drawings, there is shown for illustration one form which this invention, from its structural aspect, may assume in practice, and a number of the steps incident to the performance of its method aspect.

Fig. 1 is a view showing several steps of the manufacturing operation.

Fig. 2 is an enlarged plan view of a partly finished shear plate.

Fig. 3 is a side elevational view of the plate shown in Fig. 2.

Fig. 4 is a cross sectional view taken in a plane indicated by line 4—4 in Fig. 3.

Fig. 5 is a view similar to Fig. 2, illustrating a finished shear plate.

Fig. 6 is a side elevational view of the plate shown in Fig. 5.

Fig. 7 is an enlarged and partial longitudinal sectional view taken in a plane indicated by line 7—7 in Fig. 5.

Fig. 8 is a cross sectional view taken in a plane indicated by line 8—8 in Fig. 6.

Fig. 9 is a fragmental enlarged plan view of the shear plate shown in Fig. 5.

Fig. 10 is a fragmental enlarged sectional view taken in a plane indicated by line 10—10 in Fig. 2.

Fig. 11 is a partial enlarged reproduction of Fig. 4.

Fig. 12 is a cross sectional view taken in a plane indicated by line 12—12 in Fig. 11.

Fig. 13 is a longitudinal sectional view taken in a plane indicated by line 13—13 in Fig. 7.

Fig. 14 is a cross sectional view taken in a plane indicated by the line 14—14 in Fig. 9.

Fig. 15 is an enlarged cross sectional view of the cutting device assembly.

Fig. 16 is a perspective view of the cutter shown in Fig. 15.

Figure 17:
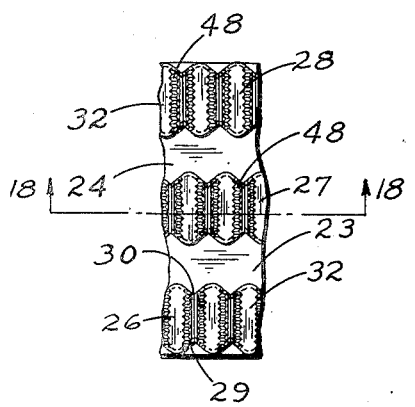

Figures 17 to 20 inclusive illustrate one modification of the invention, Fig. 17 representing a fragmental enlarged plan view of a partly finished modified shear plate.

Figure 18:
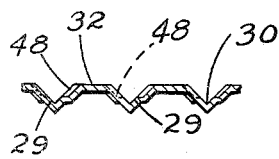

Fig. 18 is a cross sectional view taken in a plane indicated by line 18—18 in Fig. 17.

Figure 19:
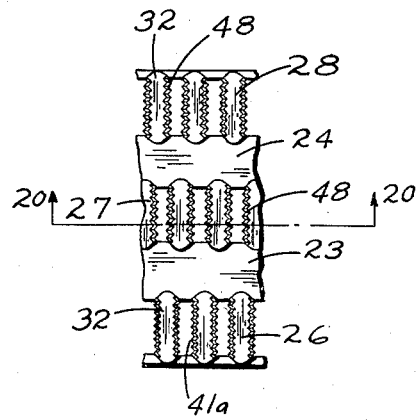

Fig. 19 is a view similar to Fig. 9 showing a portion of the finished shear plate modified as shown in Fig. 17.

Figure 20:
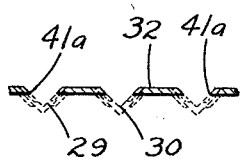

Fig. 20 is a cross sectional view taken in a plane indicated by line 20—20 in Fig. 19.

Figure 21:
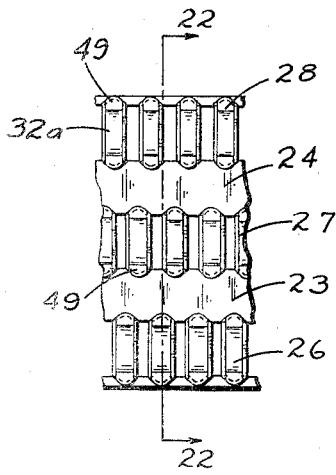
Figure 22:
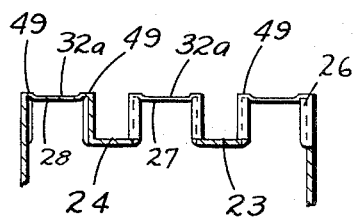

Figures 21 and 22 illustrate another modification of the invention, Fig. 21 representing a fragmental enlarged plan view of a finished modified shear plate.

Fig. 22 is a cross sectional view taken in a plane indicated by line 22—22 in Fig. 21.

In the manufacturing operation, to perform the several steps, it is desirable to use a single ram press, the ram being equipped with three different dies performing simultaneously their respective operations, or equipped with one die shaped to perform three operations during each working stroke of the ram. Referring particularly to Fig. 1, which shows three steps, A, B and C of the manufacturing operation, which steps are hereinafter referred to as the forming operation, 15 represents a strip of relatively thin metal plate, preferably of steel alloy capable to take a proper degree of hardness and toughness when tempered. This strip is automatically fed to a press where it is subjected to the first step A, including the punching of the notches 16 and of the rectangular openings 17, thereby forming a blank 18 still united to the strip 15 through a relatively narrow land 19. The openings 17 are preferably located as shown, that is, two on each side of the blank 18, for the purpose which will be explained later.

Subsequently, the strip 15 is again automatically fed a predetermined amount causing the blank 18 to move from the position A to the position B in Fig. 1. In this last position of the blank 18, electric current is automatically applied on the lands 19—19 of the blank 18, which blank, it is understood, is still shaped as shown in the position A. This electric current is calculated to instantaneously heat the blank 18 to a temperature under which temperature the blank 18 will become pliable or plastic preparatory to the shaping of the blank. Immediately prior to the contact of the die with the blank 18 still in the position B, the electric current is automatically shut off. Thereafter, the dies will engage the blank 18 to shape it as shown in Fig. 1, position B, which shape will be described hereinafter. In practice the shear plate is made of suitable steel alloy which when suddenly cooled off from a temperature above its recalescence point will become hard and tough without being excessively brittle. To harden the plate after it has been shaped as shown in the position B, and when it is still at a temperature above its recalescent point, it is allowed to momentarily remain clamped between the forming dies. In this instance, due to the thickness of the stock being shaped, the shear plate which is made of suitable steel alloy will immediately be cooled off and assume the adequate hardness and toughness necessary to assure sharpness and durability of its cutting edges. To maintain the shaping dies at the temperature best suitable to obtain the desired hardness and toughness of the shear plate, the dies may be kept cool through any suitable cooling medium such as water, air or the like.

After the shear plate has been shaped as shown in Fig. 1, position B, the strip 15 will again automatically be fed a predetermined distance, causing the blank to move from the position B to the position C, where the lands 19—19 are cut off and the blank severed from the strip 15 to finally produce the individual blank clearly shown in Figs. 2 and 3.

Referring now more particularly to the shape of the shear plate or razor head, Fig. 4 shows that it is generally of a U-shaped cross section including two parallel side walls 20 and 21 and a cross or upper wall 22. In practice, the height of the side walls is about a quarter of an inch, while the length thereof, which is equivalent to the length of the shear plate, is about an inch and a half. Each side wall is provided with two rectangular openings 17, through which the cuttings are free to drop from the razor. The cross wall 22 is formed with two longitudinally disposed parallel grooves 23 and 24 of a substantially U-shaped cross-section. The width and depth of these grooves are about one sixteenth of an inch, while each end thereof falls short of the corresponding end of the shear plate by about three thirty seconds of an inch, leaving a flat reinforcing land 25 forming each end of the upper wall 22. Formed between the grooves 23 and 24, and the longitudinal marginal edges of the upper wall 22, there are three longitudinally disposed bridges 26, 27 and 28, each bridge being about three thirty seconds of an inch wide.

Each bridge is formed with a plurality of minute grooves 29, each parallel to each other and disposed transversely of the bridge preferably at right angles with the longitudinal marginal edges thereof. These grooves, as shown in Fig. 10, are substantially V-shaped with the bottom 30 thereof extending below the normal inner wall 31 of the bridge. Between each adjacent groove 29, there is left a land forming a tooth 32. As shown in Fig. 11, each groove 29 extends downwardly within each side wall 33 of its respective bridge to form vertical V-shaped grooves 34, see Fig. 12, the bottom 35 of which is well inside or below the normal inner walls 36 of the bridge's side walls 33. Between each adjacent vertical groove 34, there is left a land forming a vertical tooth 37. The teeth 37 are actually vertical continuations of the teeth 32, which continuations, due to the V-shaped grooves 34, form pointed ends 40 for the teeth 32 acting as a comb for directing the hairs between the teeth.

An important feature of this invention resides in the lateral disposition of each bridge relative to the other. As now understood, each bridge 26, 27 and 28 is formed with V-shaped grooves 65 longitudinally spaced equally. Laterally the grooves of one bridge are somewhat off set or staggered relative to the corresponding grooves of the other bridges, in such a manner that a line coinciding with the bottom of corresponding grooves within the three bridges can be represented by the zigzag line D—D in Fig. 2. In practice, as illustrated in Fig. 2, the longitudinal space between adjacent grooves is about thirty thousandths of an inch, and the offset between the corresponding grooves of the adjacent bridges about ten thousandths of an inch and twenty thousandths of an inch between corresponding grooves of the extreme bridges 26 and 28. From the foregoing explanation, it will be understood that due to the provision of the longitudinal grooves 23 and 24 forming the bridges 26, 27 and 28, it is possible to laterally stagger the grooves or dispose them laterally in zigzag relation for the purpose which will be explained later.

To form the blank as shown in Fig. 1, position B, it is to be understood that the lower die will be of a shape corresponding to the inner shape of the blank. In other words, this lower die will include the regular block having a rectangular forming die extending upwardly therefrom. The upper wall of this die will be provided with three laterally spaced and longitudinally extending parallel square ribs corresponding to the inside shape of the bridges 26, 27 and 28. The upper wall together with the side walls of each rib being formed with V-shaped serrations corresponding to the horizontal and vertical V-shaped grooves 29 and 34 respectively. The upper die is to include the regular block, which in this instance will have its lower wall provided with an open ended slot or cavity of U-shaped cross section extending longitudinally of the upper die and adapted to receive the lower die. The bottom of this cavity will be provided with three laterally spaced longitudinally extending parallel grooves adapted to receive the ribs of the lower die. The bottom wall of each groove together with the side walls thereof will also be provided with V-shaped serrations located so as to register with the corresponding V-shaped serrations of the lower die. The serrations in the side walls of the three grooves provided within the upper die, will be of a length equal to the normal depth of the groove, thus leaving the portions of the side walls of the U-shaped slot adjacent the lower wall of the upper die perfectly smooth. As the upper die is moved toward the lower die on which rests the strip shaped as shown in Fig. 1, position A, the lower wall of the upper die will first engage the portion of the strip projecting laterally from the narrow lands 19, thereby starting the bending of the blank's side walls 20 and 21, which bending operation will continue during further downward movement of the upper die until the two side walls 20 and 21 finally contact the corresponding side walls of the lower die. Subsequently, as the upper die reaches the end of its downward stroke, the ribs formed on the upper wall of the lower die will penetrate into the corresponding grooves provided in the bottom of the U-shaped slot of the upper die to form the three bridges 26, 27 and 28. Simultaneously, the serrations provided on the lower portion of the side walls of the U-shaped slot, together with the serrations on the side walls of the grooves formed in the bottom of this slot will cooperate with the corresponding serrations provided on the side walls of the ribs of the lower die to form the vertical V-shaped serrations or grooves 34. As the upper die finally reaches the end of its downward stroke, the serrations on the bottom of the grooves in the upper die will cooperate with the serrations on the upper wall of the ribs of the lower die to form the horizontal serrations or grooves 29.

The next step in the manufacturing operation, hereinafter referred to as the grinding operation, consists in removing the inner portion of the grooves 29, or protuberances shown in dotted line in Fig. 7 and the same portion of the vertical grooves 34 shown in dotted line in Fig. 13. To this end, three grinding wheels are mounted on a single arbor and spaced in a manner corresponding to the spacing of the three bridges 26, 27 and 28. In width, the grinding wheels are slightly larger than the nominal inner width of the bridges, that is greater, by about four thousandths of an inch, than the distance between the inner side walls 36 of the bridges. The grinding wheels thus mounted on the same arbor for engagement with the internal walls of the three bridges, are fed longitudinally of the shear plate with the peripheral wall of the wheels cutting about two thousandths of an inch off the inner walls 31 of the bridges' cross wall 26, and the side walls of the wheels cutting a similar amount off the inner side walls 36. Through this grinding operation longitudinally of the shear plate, there are formed three similar U-shaped channels forming the inner walls of the bridges 26, 27 and 28, each bridge being formed with a plurality of minute U-shaped teeth designated by 38 in Fig. 14, longitudinally aligned with a minute opening between each adjacent tooth formed by the grinding or removal of the inner portion of the V-shaped grooves 29 and 34. As shown in Fig. 13, these side walls or side teeth 37 are substantially triangular in cross section forming two sharp parallel cutting edges 39—39 of an angle materially less than 90°. As shown in Fig. 9, the shape of the cross wall of the U-shaped teeth 38, which cross wall actually forms an horizontal tooth 32, is substantially rectangular with pointed ends 40 forming a comb for directing the hairs to be sheared between the teeth of the shear plate. In longitudinal cross section shown in Fig. 7, the horizontal teeth 32 are of a trapezoidal shape forming two sharp parallel cutting edges 41—41 of an angle materially less than 90°.

To clearly illustrate the application of the shear plate 18, there is shown in Fig. 15 an enlarged cross sectional view of the shear plate and cutter 42 mounted for operative engagement. In Fig. 16, the cutter is shown in perspective illustrating the bridges 43, 44 and 45 closely fitted within the corresponding bridges 26, 27 and 28 of the shear plate 18 as shown in Fig. 15. The bridges of the cutter are also formed with horizontal teeth 46 and vertical teeth 47 cooperating with the teeth 32 and 37 respectively of the shear plate for effecting the shearing or cutting operation. If it is desired, the three bridges 43, 44 and 45 of the cutter may be made somewhat narrower than the corresponding inner width of the bridges of the shear plate 18, thereby allowing the cutter to engage only the inner horizontal wall of the shear plate to cooperate with the horizontal teeth 32 for effecting the shearing action. In this instance, the vertical teeth 37 which are now spaced from the corresponding vertical walls of the cutter 42, will also act as a comb for directing the hairs to be sheared between the teeth 32 of the shear plate. In practice, the cutter 42 is reciprocated relative to the shear plate 18 by any suitable device such as an electric motor or the like, thereby causing its teeth 46 and 47 to move relative to the corresponding teeth 32 and 37 of the shear plate 18 and overlap the same for shearing the hairs located therebetween. To assure adequate engagement of the cutter external wall with the inner wall of the shear plate, the cutter is preferably urged into engagement with the shear plate by any suitable means such as a compression spring or the like.

In the modification illustrated in Figs. 17 to 20 inclusive, the side walls of each V-shaped groove 29 instead of being formed perfectly smooth as shown in Figs. 2, 10 and 11, are corrugated by the formation of parallel minute V-shaped grooves 48 extending from the land 32 toward the bottom 30 of the groove 29. In depth, the grooves 48 are only few thousandths of an inch, and in length they are made to extend below the normal inner wall 31 of the teeth 32. This corrugation of the side walls of the grooves 29 is accomplished during the shaping of the shear plate while the blank is in plastic condition as previously explained in connection with Fig. 1, position B. To this end, the shaping die will of course be formed with similar corrugations which may be etched or machined thereon.

The shearing plate formed with V-shaped grooves 29 having corrugated side walls, is subsequently ground in the manner previously described. In this instance, the corrugated side walls of the grooves 29 will form with the inner side 31 of the teeth 32, serrated cutting edges 41a—41a of an angle also less than 90°. While shaving, these serrations will prevent movement of the hairs relative to the blade and will cooperate with the cutter 42 for effecting a clear and efficient shave.

In the modification shown in Figs. 21 and 22, the top of each tooth 32 instead of being perfectly flat as shown in Figs. 9 and 11, is shaped with two vertical elevations 49—49 forming the pointed ends 40—40 of the tooth. These elevations extend about ten to twelve thousandths of an inch higher than the normal upper wall 32a of the tooth, and are formed during the shaping of the shear plate while the blank is in plastic condition as previously explained in connection with Fig. 1, position B. In practice, the raised ends 49—49 of each tooth constitute skin engaging spots depressing the skin when a slight pressure is applied on the razor. The skin thus depressed will bulge between these spots in close relation to the cutting edges of the teeth, enabling a close cutting action of the hairs without danger of scratching or irritating the skin.

From the foregoing explanation, it will be understood that the shear plate or razor head of the type described is manufactured by a simple and efficient method eliminating the use of delicate cutting tools, thereby greatly reducing the manufacturing cost and producing a shear plate formed with teeth having sharp horizontal and vertical cutting edges. The shear plate being further characterized by the lateral zigzag disposition of its teeth, thereby allowing a surface equal in width to the length of the shear plate to be shaven during each stroke of the razor. The shear plate being still further characterized by the pointed ends of its horizontal teeth, which pointed ends act as a comb for directing the hairs between the teeth preparatory to the cutting thereof.

While the foregoing is a specific description of one form which the invention may assume in practice, it will be understood that this form is shown for purpose of illustration, and that the invention may be modified and embodied in various other forms without departing from its spirit and the scope of the appended claims.

I claim:

1. A method of manufacturing improved razor heads or the like comprising bending a thin metal plate to form a head of substantially channel-shaped cross section, stamping a plurality of longitudinally spaced substantially V-shaped grooves extending laterally of the cross wall of said head and partway downwardly of the side walls thereof, the bottom of each groove extending below the normal inner walls of said head, and subsequently grinding smooth said inner walls, thereby transforming said grooves into horizontal and vertical slots and each space between adjacent grooves into a tooth having two inclined side walls resulting from the formation of said grooves, which side walls form with the smooth inner walls of said head sharp cutting edges.

2. A method of manufacturing improved razor heads or the like comprising bending a thin metal plate to form a head of substantially channel-shaped cross section, forming the cross wall of said head with a plurality of laterally spaced longitudinally extending bridges, forming on each of said bridges a plurality of longitudinally spaced substantially V-shaped grooves extending laterally of said plate with the corresponding grooves of each bridge in staggered relation, the depth of each groove being greater than the thickness of said plate, and subsequently machining the protuberances depending from the underside of each bridge due to the formation of said grooves to produce spaced slots having inclined side walls resulting from the formation of said grooves, which side walls form with the underside of the space between adjacent slots sharp cutting edges.

3. A method of manufacturing an improved razor head or the like comprising stamping from relatively thin metal a blank of appropriate configuration including a substantially rectangular skin contacting surface formed with a plurality of longitudinally extending and laterally spaced bridges of substantially U-shaped cross section, stamping on each bridge a plurality of longitudinally spaced set of grooves, each set including two diametrically opposed vertical grooves one on each side wall of said bridge united by a horizontal open ended groove on the cross wall of said bridge, said grooves being of substantially V-shaped cross section and of a depth greater than the thickness of said metal, and subsequently grinding smooth the inner walls of said bridges to transform said grooves into vertical and open ended horizontal slots and the space between adjacent slots into a tooth formed with pointed ends resulting from the formation of said vertical grooves.

4. A method of manufacturing an improved razor head or the like comprising stamping a relatively thin metal plate into a blank of appropriate configuration including a plurality of longitudinally extending laterally spaced bridges of substantially U-shaped cross section, forming on the cross wall of each of said bridges a plurality of minute grooves extending partway downwardly of the side walls thereof, the depth of said grooves being greater than the thickness of said plate to produce on the underside of said bridges corresponding protuberances, and grinding off said protuberances for transforming the grooves of said cross walls into minute slots extending through said side walls.

5. A method of manufacturing an improved razor head or the like comprising stamping from relatively thin metal a blank of appropriate configuration including a substantially rectangular skin contacting wall carried by laterally spaced supporting walls depending therefrom, stamping on said skin contacting wall a plurality of longitudinally spaced substantially V-shaped open ended grooves extending laterally of said wall in staggered relation and downwardly of said supporting walls, the bottom of said grooves extending beyond the normal underside of said skin contacting and supporting walls and forming thereon corresponding protuberances, and subsequently grinding off said protuberances, thereby transforming said grooves into slots through said skin contacting wall extending through said supporting walls and each space between two adjacent slots into a tooth having two inclined side surfaces resulting from the formation of said grooves, which side surfaces form with the underside of said skin contacting and supporting walls sharp cutting edges.

6. A method of manufacturing improved shear plates for razors or the like comprising shaping by any suitable means a relatively thin metal plate to form a blank of substantially channel shaped configuration including a plurality of minute grooves extending laterally of the cross wall of said blank and partway downwardly of the side walls thereof, the space between adjacent grooves on said cross wall forming a substantially flat land having raised spots forming the lateral ends thereof, the depth of said grooves being greater than the thickness of said plate and forming on the inner surface of said blank corresponding protuberances, and subsequently grinding off said protuberances, thereby transforming the grooves of said cross wall into slots extending through said side walls and the space between adjacent slots of said cross wall into substantially flat teeth having skin contacting raised spots forming the ends thereof.

7. The method of manufacturing an improved razor head comprising bending a relatively thin metal plate to form an elongated blank including a skin contacting wall and a supporting wall therefor extending angularly relative thereto, stamping on said skin contacting wall a plurality of longitudinally spaced laterally extending grooves extending into said supporting wall, the depth of said grooves being greater than the thickness of said plate to produce on the underside of said walls protuberances, and grinding off said protuberances for transforming the grooves of said skin contacting wall into slots extending through said supporting wall.

WENDELL L. MARTIN.